INVENTOR.
HARRY F. HITNER and ROY G. EHMAN.
BY Bradley & Bee
ATTORNEYS.

July 30, 1940.   R. G. EHMAN ET AL   2,209,515
ELECTRODE FOR GLASS MELTING FURNACE
Filed Jan. 11, 1939   2 Sheets-Sheet 2

INVENTOR.
HARRY F. HITNER and ROY G. EHMAN.
BY Bradley & Bee
ATTORNEYS.

Patented July 30, 1940

2,209,515

UNITED STATES PATENT OFFICE 2,209,515

ELECTRODE FOR GLASS MELTING FURNACE

Roy G. Ehman, Brackenridge, and Harry F. Hitner, Oakmont, Pa., assignors to Pittsburgh Plate Glass Company, a corporation of Pennsylvania Application January 11, 1939, Serial No. 250,324

4 Claims. (Cl. 13—6)

The invention relates to electrodes primarily designed for use in a glass melting furnace in which the heating effect on the glass or batch in the furnace is secured by the resistance of the material in the furnace to the passage of electric current. One of the most satisfactory materials for the composition of the electrodes is carbon in some form or other, such as graphite, the term "carbon" as used herein comprehending all forms suitable for electrodes of which graphite is a specific example. Certain electrodes, while most suitable for the desired service in many particulars, have the drawback that they tend to burn off inside the furnace wall through which they extend. At the inner end, the electrode is covered by the molten glass and, therefore, protected from oxidation, but inside the furnace wall, there is no such protection, and the electrode will burn through in a comparatively short time at any point where the temperature approximates 1400 degrees F., due to the gradual infiltration of air through the furnace wall or along the joint between the wall and the electrode, such air supplying the oxygen necessary to produce combustion of the carbon.

Figure 1:
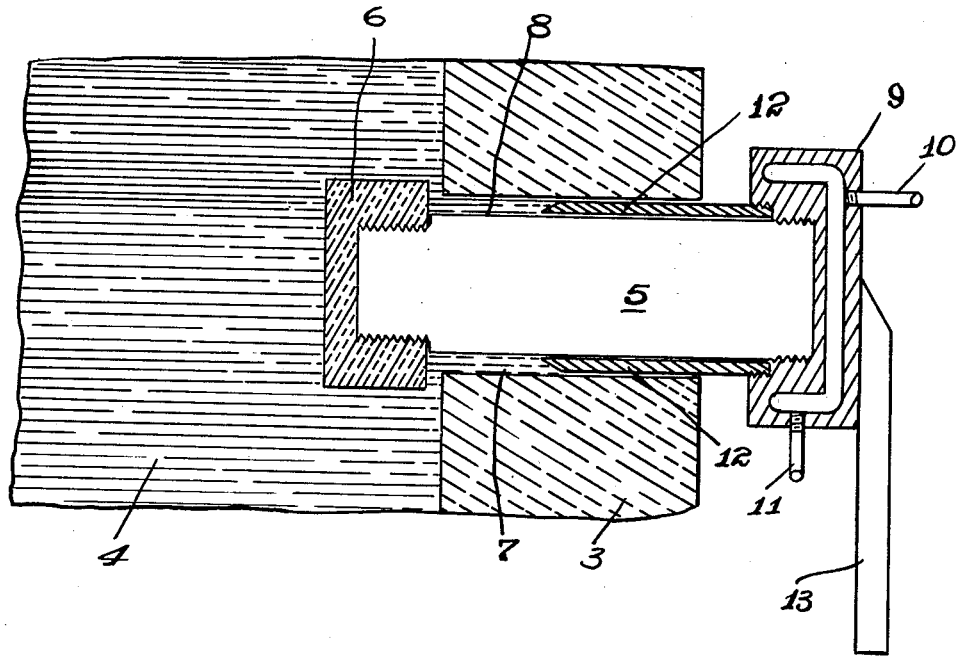
Figure 2:
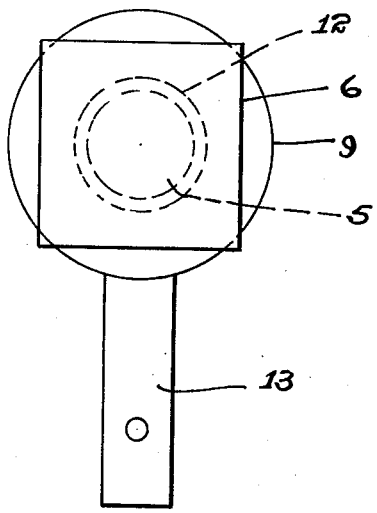
Figure 3:
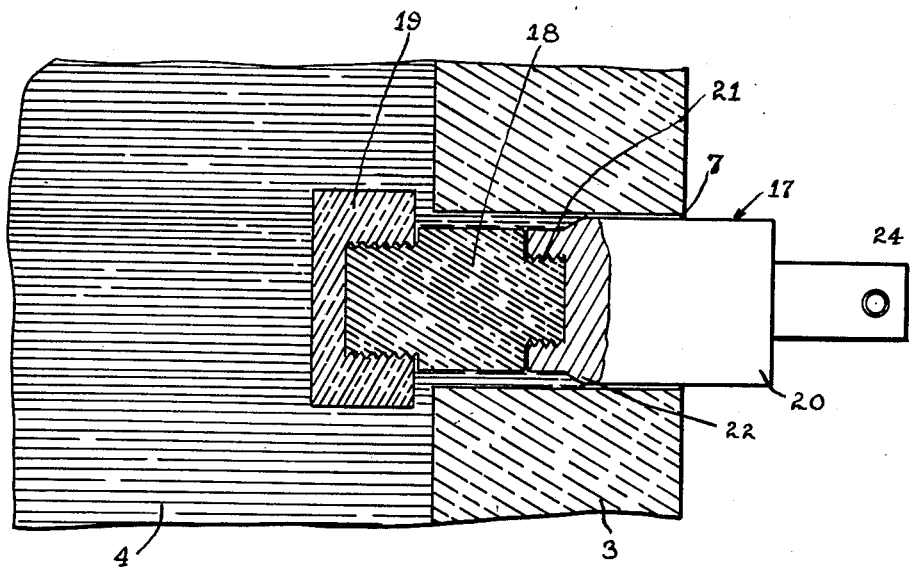

The main object of the present invention is to provide a cheap, simple means for overcoming the difficulty above recited and for preventing the carbon electrode from burning off inside the furnace wall, so that the substitution of new electrodes need be made only after the electrode has been completely worn out due to the corrosion of the glass at the end thereof located in the glass bath. Certain preferred embodiments of the invention are shown in the accompanying drawings, wherein:

Figure 1 is a section through the electrode mounted in the wall of a furnace. Figure 2 is an end elevation of the electrode. And Figure 3 is a section through a modified form of electrode mounted in the wall of a furnace.

Referring to the drawings, 3 is one of the walls of a furnace of refractory material, such as clay or fire-brick and 4 is a body of molten material, such as glass, beneath whose level the electrode is located. The body 5 of the electrode is graphite and carries on its inner end an enlargement 6, in this instance, a cap of the same composition as the body. The cap, as shown, is threaded onto the body, but might be otherwise attached to or made integral with the body. The diameter of the perforation 7 in the wall of the tank is substantially greater than the diameter of the body of the electrode, thus permitting the inflow along the body of a layer or sleeve of glass 8 which surrounds the body 5 for a substantial portion of its length.

Threaded to the outer end of the body 5 is a metal cap 9 which is preferably hollow and provided with connections 10 and 11 for the circulation of a cooling fluid, such as water. The cap may be of ordinary cast steel or cast iron and might be secured to the end of the body 5 by means other than the screw connection shown.

Threaded into the cap 9 and having a free sliding fit on the body 5 of the electrode is a metal tube 12 preferably of refractory composition, such as stainless steel, although ordinary steel tubing may be employed. The inner end of this tube acts as a closure or stop against the penetration or flow of the layer of glass 8 to the exterior past such end. The layer of glass at this point is solidified or frozen, preventing any further lateral penetration either on the exterior of the tube 12 or on the interior thereof. Current is supplied to the electrode by means of the copper terminal strap 13 welded to the face of the cap 9.

The arrangement, as above described, provides for the protection of the body 5 of the electrode against the action of air inside the limits of the wall 3. Due to its contact with the molten glass, the temperature of the body 5, for a very considerable distance back from the inner face of the wall, is at least 1400 degrees F. or greater, and if any access of air is allowed to the graphite at such temperatures, combustion occurs and the body is burned off long before the inner end of the electrode is eroded away by the action of the glass. The inner portion of the electrode is sealed off from the action of the air by the body of glass in the furnace or tank and by the glass layer or sleeve 8, while the remainder is sealed off and protected by the metal tube 12 and the cap 9. As a result, the body 5 will, in service, never burn out inside the limits of the wall in which it is mounted. Another advantage of the invention resides in the enlarged cap upon the inner end of the electrode, which acts as a guard to prevent erosion of the furnace wall around the perforation, due to convection currents set up in the body of molten glass.

When the inner portion of the electrode is destroyed, due to the action of the glass thereon, it may easily be removed from the tube 12 and cap 9 and the latter parts may be utilized again with a new graphite member. The water cooling of the cap 9 renders the electrode more easy to handle and adjust and further gives protection to the screw joint by which the tube is attached to the cap, so that when it becomes necessary, there is no difficulty in unscrewing the parts. Other advantages incident to the simplicity and durability of the structure will be apparent to those skilled in the art.

A modified form of electrode is illustrated in Figure 3 of the drawings. The furnace construction is similar to that hereinbefore shown and described. The electrode 17, fitting within the perforation 7 in the wall 3 of the tank, has a comparatively short body portion 18 of graphite. Upon the inner end of the body portion is secured a cap section 19 of the same composition as the body of the electrode. A cylindrical member 20 of stainless steel or other heat-resisting alloy is secured to the outer end of the body portion 18 through a threaded coupling 21 which facilitates replacement of the graphite portion of the electrode. The member 20 is provided with an annular shoulder 22 which acts as a closure or stop against the outward flow of the glass through the perforation 7. It is at this point that the glass seal which inhibits erosion of the graphite electrode is established. Current is supplied to the electrode 17 through the terminal strap 24 which projects from the exterior face of the member 20.

We are aware that carbon electrodes have been heretofore sheathed with clay, but such material is readily subject to air penetration because of its porosity, and the difficulty as to burning off inside the wall limits, is helped in only a negligible degree. We are further aware that some protection has been secured by forcing an inert gas, such as nitrogen, through the body of the carbon to prevent an inflow of air, but this expedient obviously involves considerable complication and expense and is less effective in protecting the electrode than the means herein set forth.

What we claim is:

1. In combination in a furnace having a refractory wall with a perforation extending therethrough at a level below that of the molten material to be carried by the furnace, a carbon electrode of substantially less diameter than the perforation extending through the perforation with its inner end inward of the plane of the inner face of the wall and its outer end outward of the plane of the outer face of the wall, a metal cap secured to the outer end of the electrode and fitting thereover, a metal sleeve surrounding the electrode secured at its outer end to the cap and extending inward along the electrode to a point intermediate the inner and outer faces of the wall, so that its inner end limits the outward flow of the molten material through the space between the wall of the perforation and the electrode, and an electrical connection to the cap.

2. In combination in a furnace having a refractory wall with a perforation extending therethrough at a level below that of the molten material to be carried by the furnace, a carbon electrode of substantially less diameter than the perforation extending through the perforation with its inner end inward of the plane of the inner face of the wall and its outer end outward of the plane of the outer face of the wall, a metal cap secured to the outer end of the electrode and fitting thereover, a metal sleeve surrounding the electrode secured at its outer end to the cap and extending inward through the perforation to a point short of the inner face of the wall a substantial distance, the inner end of the sleeve acting as a closure means up to which the molten material may move outward through the space between the wall of said perforation and the electrode, and an electrical connection to the cap.

3. In combination in a furnace having a refractory wall with a perforation extending therethrough at a level below that of the molten material to be carried by the furnace, a carbon electrode of substantially less diameter than the perforation extending through the perforation with its inner end inward of the plane of the inner face of the wall and its outer end outward of the plane of the outer face of the wall, a metal cap secured to the outer end of the electrode and fitting thereover, means for water cooling the cap, a metal sleeve secured at its outer end to the cap surrounding the electrode to a point intermediate the inner and outer faces of the wall, so that its inner end limits the outward flow of the molten material through the space between the wall of the perforation and the electrode, and an electrical connection to the cap.

4. In combination in a furnace having a refractory wall with a perforation extending therethrough at a level below that of the molten material to be carried by the furnace, a carbon electrode of substantially less diameter than the perforation extending through the perforation with its inner end inward of the plane of the inner face of the wall and its outer end outward of the plane of the outer face of the wall, a metal cap secured to the outer end of the electrode and fitting thereover, a metal sleeve of highly refractory composition surrounding the electrode secured at its outer end to the cap and extending inward along the electrode to a point intermediate the inner and outer faces of the wall, so that its inner end limits the outward flow of the molten material through the space between the wall of the perforation and the electrode, and an electrical connection to the cap.

ROY G. EHMAN.
HARRY F. HITNER.